United States Patent
Sakai et al.

(10) Patent No.: US 10,836,044 B2
(45) Date of Patent: Nov. 17, 2020

(54) ROBOT CONTROL DEVICE AND ROBOT CONTROL METHOD

(71) Applicant: FUJITSU LIMITED, Kawasaki (JP)

(72) Inventors: Yusuke Sakai, Kawasaki (JP); Masao Nishijima, Kawasaki (JP); Yuki Yoshimura, Fukuoka (JP); Shingo Tokunaga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 15/925,426

(22) Filed: Mar. 19, 2018

(65) Prior Publication Data
US 2018/0281196 A1 Oct. 4, 2018

(30) Foreign Application Priority Data

Mar. 31, 2017 (JP) ................ 2017-071711

(51) Int. Cl.
| | | |
|---|---|---|
| B25J 9/16 | (2006.01) | |
| B25J 13/00 | (2006.01) | |
| B25J 13/08 | (2006.01) | |
| B25J 11/00 | (2006.01) | |
| G05B 19/045 | (2006.01) | |
| G06K 9/00 | (2006.01) | |

(52) U.S. Cl.
CPC ........ *B25J 9/1694* (2013.01); *B25J 11/0005* (2013.01); *B25J 11/008* (2013.01); *B25J 13/003* (2013.01); *B25J 13/006* (2013.01); *B25J 13/089* (2013.01); *G05B 19/045* (2013.01); *G06K 9/00335* (2013.01); *G05B 2219/40413* (2013.01); *G05B 2219/40414* (2013.01)

(58) Field of Classification Search
CPC .... B25J 9/1694; B25J 11/0005; B25J 11/008; B25J 13/003; B25J 13/006; B25J 13/089; G05B 19/045; G05B 2219/40413; G05B 2219/40414; G06K 9/00335
See application file for complete search history.

(56) References Cited

U.S. PATENT DOCUMENTS

| | | |
|---|---|---|
| 6,347,261 B1 | 2/2002 | Sakaue et al. |
| 2007/0192910 A1* | 8/2007 | Vu .......................... B25J 5/007 700/245 |

FOREIGN PATENT DOCUMENTS

JP      2001-038658      2/2001

* cited by examiner

*Primary Examiner* — Basil T. Jos
(74) *Attorney, Agent, or Firm* — Fujitsu Patent Center

(57) ABSTRACT

A robot control device includes a memory and a processor configured to acquire first environmental information regarding a surrounding environment of a robot, specify a first appropriate level associated with a first activity based on the first environmental information by referring to a control policy in which activity information on an activity which has been conducted by the robot, environmental information at a time of conduction of the activity, and appropriate level determined based on a reaction to the activity are associated with each other, and when the first appropriate level information of the first activity does not satisfy a specific condition, deter conduction of the first activity by the robot.

15 Claims, 10 Drawing Sheets

FIG. 4

| NAME | DETAIL | EXAMPLE |
|---|---|---|
| EVENT INFORMATION | ID FOR UNIQUELY IDENTIFY EVENT | Robo235-iawejp |
| USER ID | USER ID WHO HAS HAD CONVERSATION WITH ROBOT | RoboUser |
| OCCURRENCE DATE AND TIME | START DATE AND TIME OF EVENT | 2016-11-25T06:40:43.421Z |
| OCCURRENCE LOCATION | OCCURRENCE LOCATION OF EVENT | PUBLIC 1 (COMPANY), PUBLIC 2 (SCHOOL OF CHILD), PRIVATE 1 (HOME), PRIVATE 2 (SPORT GYM) |
| CONVERSATION DETAIL | DETAILS OF CONVERSATION BETWEEN ROBOT AND USER | R "CONVERSATION 1", U "CONVERSATION 2", R "CONVERSATION 3", U "CONVERSATION 4", … |
| OCCURRENCE ENVIRONMENT | | |
| VIDEO DATA | IMAGE DATA OF EVENT | |

| NAME | DETAIL |
|---|---|
| MEMBER GROUP | MEMBER INFORMATION OF PERSONS WHO HAVE PARTICIPATED IN EVENT |
| SOUND VOLUME LEVEL | SOUND VOLUME LEVEL OF VOICE OF HUMAN |
| TONE | PITCH (TONE) OF VOICE OF HUMAN |

FIG. 5

| | NAME | DETAIL | EXAMPLE |
|---|---|---|---|
| 6411 | EVENT ID | ID FOR UNIQUELY IDENTIFY EVENT | Robo235-iawejp |
| 6412 | OCCURRENCE LOCATION | OCCURRENCE LOCATION OF EVENT | PRIVATE 1 (HOME) |
| 6413 | MEMBER GROUP | MEMBER INFORMATION OF PERSONS WHO HAVE PARTICIPATED IN EVENT | {MYSELF, FRIEND A} |
| 6414 | CONVERSATION THEME | THEME OF CONVERSATION BETWEEN ROBOT AND USER | SCHEDULE |
| 6415 | CONVERSATION KEYWORD | KEYWORD INCLUDED IN CONVERSATION | {SCHEDULE, TOMORROW, AFTERNOON, COMPANY} |
| 6416 | USER EMOTION | EMOTION OF HUMAN | ANGER |
| 6417 | APPROPRIATE LEVEL | INFORMATION INDICATING TO WHAT EXTENT ACTIVITY IS PERMITTED OR DETERRED | 1 |

641

ROBOT CONTROL DEVICE AND ROBOT CONTROL METHOD

CROSS-REFERENCE TO RELATED APPLICATION

This application is based upon and claims the benefit of priority of the prior Japanese Patent Application No. 2017-71711, filed on Mar. 31, 2017, the entire contents of which are incorporated herein by reference.

FIELD

The embodiments discussed herein are related to a control technique for a robot.

BACKGROUND

Robots which autonomously select a subject and talks have been developed. It is expected that this type of robot plays a supporting role in the living space of human. For instance, Japanese Laid-open Patent Publication No. 2001-38658 discloses related arts.

SUMMARY

According to an aspect of the invention, a robot control device includes a memory and a processor configured to acquire first environmental information regarding a surrounding environment of a robot, specify a first appropriate level associated with a first activity based on the first environmental information by referring to a control policy in which activity information on an activity which has been conducted by the robot, environmental information at a time of conduction of the activity, and appropriate level determined based on a reaction to the activity are associated with each other, and when the first appropriate level information of the first activity does not satisfy a specific condition, deter conduction of the first activity by the robot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating event information in the robot system as an example of the embodiment;

FIG. 5 is a diagram illustrating filter information in the robot system as an example of the embodiment;

DESCRIPTION OF EMBODIMENTS

Prior art robots only operate in accordance with a program, and thus a user may feel unpleasant for a subject presented by one of such robots. Also, depending on the surrounding environment (the location, or the member group at the location) of a robot, a subject presented by the robot may be inappropriate to the environment.

Hereinafter, an embodiment according to a control program for a robot, a robot device, and a control method for a robot will be described with reference to the drawings. However, the embodiment below is only illustrations, and it is not intended to exclude various modifications and application of techniques which are not explicitly described in the embodiment. That is, an embodiment may be modified in various manners (such as combining an embodiment with a modification), and implemented within a range not departing from the spirit of the embodiment. Each of the figures is not intended to include only the components illustrated in the figure, but may include other functions.

[1. Hardware Configuration]

Figure 1:
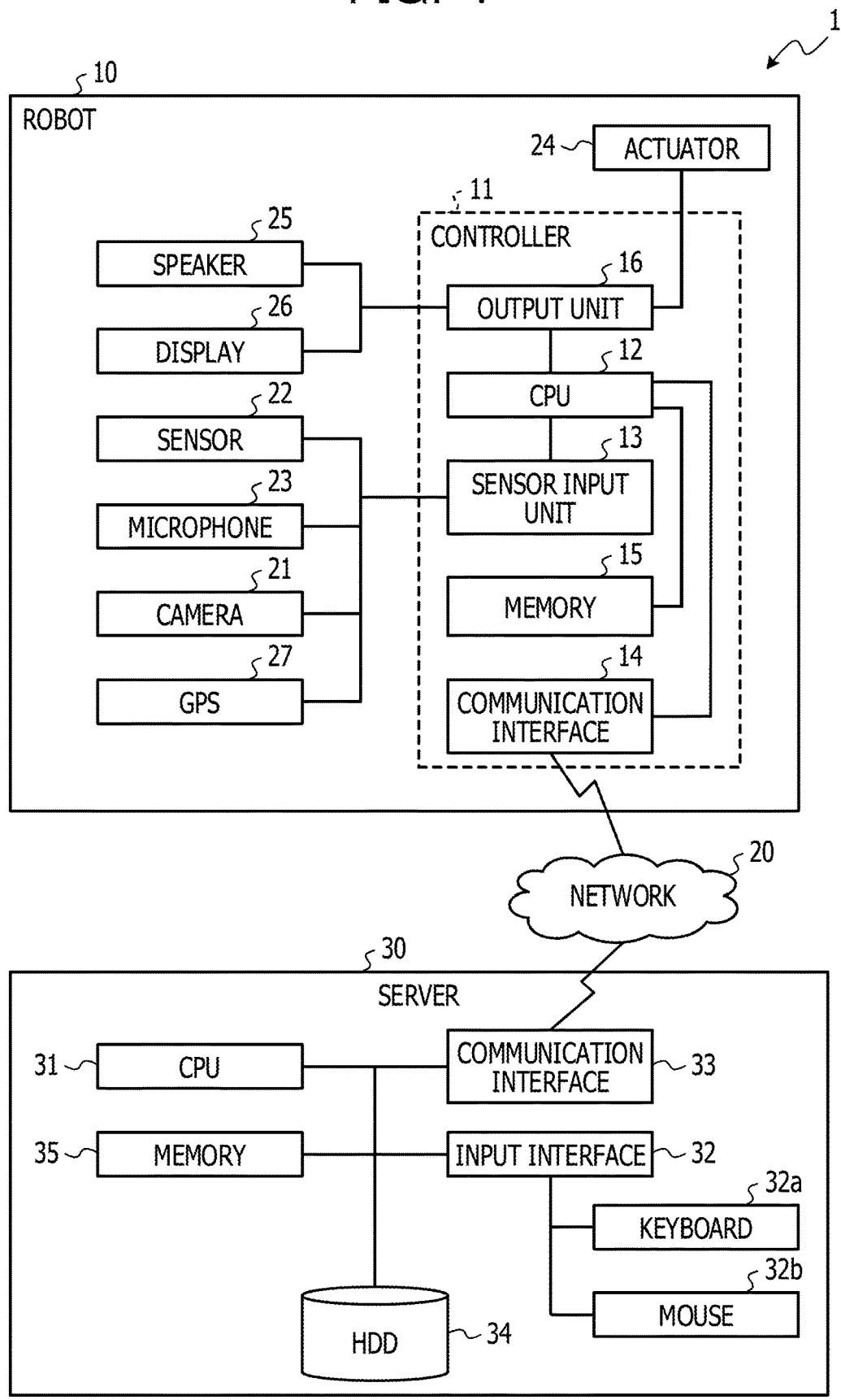
FIG. 1 is a diagram illustrating the hardware configuration of a robot system as an example of an embodiment.

The hardware configuration of a robot system 1 according to this embodiment is illustrated in FIG. 1.

The robot system 1 includes a robot (robot device) 10 and a server 30.

The robot 10 is connected a server 30 via a network 20, for instance, by wireless communication to allow communication with the server 30.

First, the hardware configuration of the server 30 will be described. The server 30 includes a central processing unit (CPU) 31, an input interface 32, a communication interface 33, a hard disk drive (HDD) 34, a memory 35, a keyboard 32a, and a mouse 32b.

The CPU 31 calls and executes a software program recorded in the HDD 34, and generates a control signal based on information transmitted from the input interface 32 and the communication interface 33. The control signal generated here is outputted to the robot 10 via the communication interface 33, for instance.

The keyboard 32a and the mouse 32b are connected to the input interface 32. The input interface 32 converts a voltage signal inputted from the keyboard 32a and the mouse 32b into numerical information and transmits the numerical information to the CPU 31. The keyboard 32a and the mouse 32b are devices that are operated by an operator for various inputs. It is to be noted that the mouse 32b is an example of a pointing device, and other pointing devices may also be used. The other pointing devices include a touch panel, a tablet, a touchpad, and a trackball.

The communication interface 33 is connected to the network 20. The communication interface 33 transmits and receives data to and from the robot 10 via the network 20.

The HDD 34 magnetically writes and reads data to and from a built-in disk. The HDD 34 is used as an auxiliary storage device of the server 30. The HDD 34 stores an operating system (OS), an application program, and various pieces of data. It is to be noted that a semiconductor memory device (solid state drive), such as a storage class memory or a flash memory may also be used as an auxiliary storage device. Also, the HDD 34 corresponds to a storage unit that stores data in association with information indicating an environment at the time of activity of the robot 10.

The memory 35 is a storage device including a read only memory (ROM) and a random access memory (RAM). In the ROM of the memory 35, an OS, a program that implements a robot control function in this embodiment, and data for the program are written. A software program in the memory 35 is read into the CPU 31 as appropriate and executed. Also, the RAM in the memory 35 is utilized as a main storage memory or a working memory.

The server 30 implements the robot control function in this embodiment by executing programs (such as a robot control program) stored, for instance in a computer-readable non-volatile recording medium. A program, in which the details of processing to be performed by the server 30 are written, may be stored in various recording media. For instance, a program to be executed by the server 30 may be stored in the HDD 34. The CPU 31 loads at least part of the programs in the HDD 34 to the memory 35, and executes the loaded program.

Also, a program to be executed by the server 30 (CPU 31) may be recorded in a non-volatile portable recording medium, such as an optical disc, the memory 35 which are not illustrated, and a memory card which is not illustrated. A program stored in a portable recording medium is installed in the HDD 34, for instance, by the control from the CPU 31, then becomes executable. Also, the CPU 31 may directly read a program from the portable recording medium and may execute the program. It is to be noted that the server 30 is not limited to a server computer which is physically configured as described above, and a server virtually constructed on the Internet may be used utilizing a cloud service such as platform as a service (Paas).

Next, the hardware configuration of the robot 10 will be described. The robot 10 includes a camera 21, a sensor 22, a microphone 23, a global positioning system (GPS) 27, an actuator 24, a speaker 25, a display 26, and a controller 11.

The camera 21 is an imaging device that captures an image of the surroundings of the robot 10.

The sensor 22 is a device that monitors an object and/or detects a phenomenon. Also, the sensor 22 includes an infrared sensor, an electrostatic sensor, and a temperature sensor.

The microphone 23 is a device that detects sound.

The GPS 27 is a device for measuring a current position.

The actuator 24 is a device that provides drive and control to the robot 10 in order to physically operate the robot 10.

The speaker 25 is a sound device for outputting sound.

The display 26 is a device for displaying image signals.

The camera 21, the sensor 22, the microphone 23, and the GPS 27 are each an input device for the robot 10 to recognize an act of a human in communication with the robot 10. In contrast, the actuator 24, the speaker 25, and the display 26 are each an output device for implementing an act of the robot 10 in communication with a human. Also, various sensors and actuators mentioned above are controlled by the later-described controller 11 in a centralized manner.

Also, the camera 21, the sensor 22, the microphone 23, the GPS 27, the actuator 24, the speaker 25, and the display 26 may be built in the robot 10 or may be provided outwardly of the robot 10.

The controller 11 includes a CPU 12, a sensor input unit 13, a communication interface 14, a memory 15, and an output unit 16, and is connected to the various sensors and the actuator 24 via a bus (a communication line not illustrated) provided in the robot 10 to allow mutual communication, and manages the entire information processing within the robot 10 in a centralized manner.

The CPU 12 is a control device and implements various functions by calling software programs recorded in the memory 15. For instance, the CPU 12 generates a control signal based on information transmitted from the sensor input unit 13 and the communication interface 14. The control signal generated here is outputted to the actuator 24, the speaker 25, and the display 26 via the output unit 16.

The sensor input unit 13 converts an electrical signal inputted from the camera 21, the sensor 22, the microphone 23, and the GPS 27 into numerical information and transmits the numerical information to the CPU 12.

The communication interface 14 is connected to the network 20, for instance, via an antenna device which is not illustrated, and transmits and receives data to and from the server 30. The communication interface 14 converts a wireless signal received via the antenna device into numerical information, and transmits the numerical information to the CPU 12.

The memory 15 is a storage device including a ROM and a RAM. In the ROM of the memory 15, an OS, a software program relevant to communication with a human, and data for the program are written. A software program in the memory 15 is read into the CPU 12 as appropriate and executed. Also, the RAM in the memory 15 is utilized as a main storage memory or a working memory.

The actuator 24, the speaker 25, and the display 26 are connected to the output unit 16. The output unit 16 controls the operation of the actuator 24, the speaker 25, and the display 26, and converts a control signal transmitted from the CPU 12 into a drive voltage signal of the actuator 24, the speaker 25, and the display 26.

Each of the sensor input unit 13, the communication interface 14, and the output unit 16 described above may be provided on a substrate in which the CPU 12 and the memory 15 are provided, or may be provided on an independent substrate (so-called, a sensor input board, a communication board, a motor control board, and an voice output board).

It is to be noted that the robot 10 executes, for instance, a program stored in a computer-readable non-volatile recording medium, thereby implementing the robot activity function of this embodiment. A program, in which the details of processing to be performed by the robot 10 are written, may be stored in various recording media. For instance, at least part of the program to be executed by the robot 10 is loaded in the memory 15, and the loaded program is executed.

Also, the program to be executed by the robot 10 (CPU 12) may be stored in a non-volatile portable storage medium, such as an optical disc (not illustrated), the memory 15, a memory card (not illustrated). A program stored in a portable recording medium is installed in the memory 15, for instance, by the control from the CPU 12, then becomes executable. Also, the CPU 12 may directly read a program from the portable recording medium and may execute the program.

Referring to FIGS. 3 to 10, the robot 10 having thus configured hardware configuration implements the later-described robot control function of the embodiment. It is to be noted that in this embodiment, the program for implementing the robot control function is provided in both the robot 10 and the server 30.

[2. Functional Block]

Figure 2:
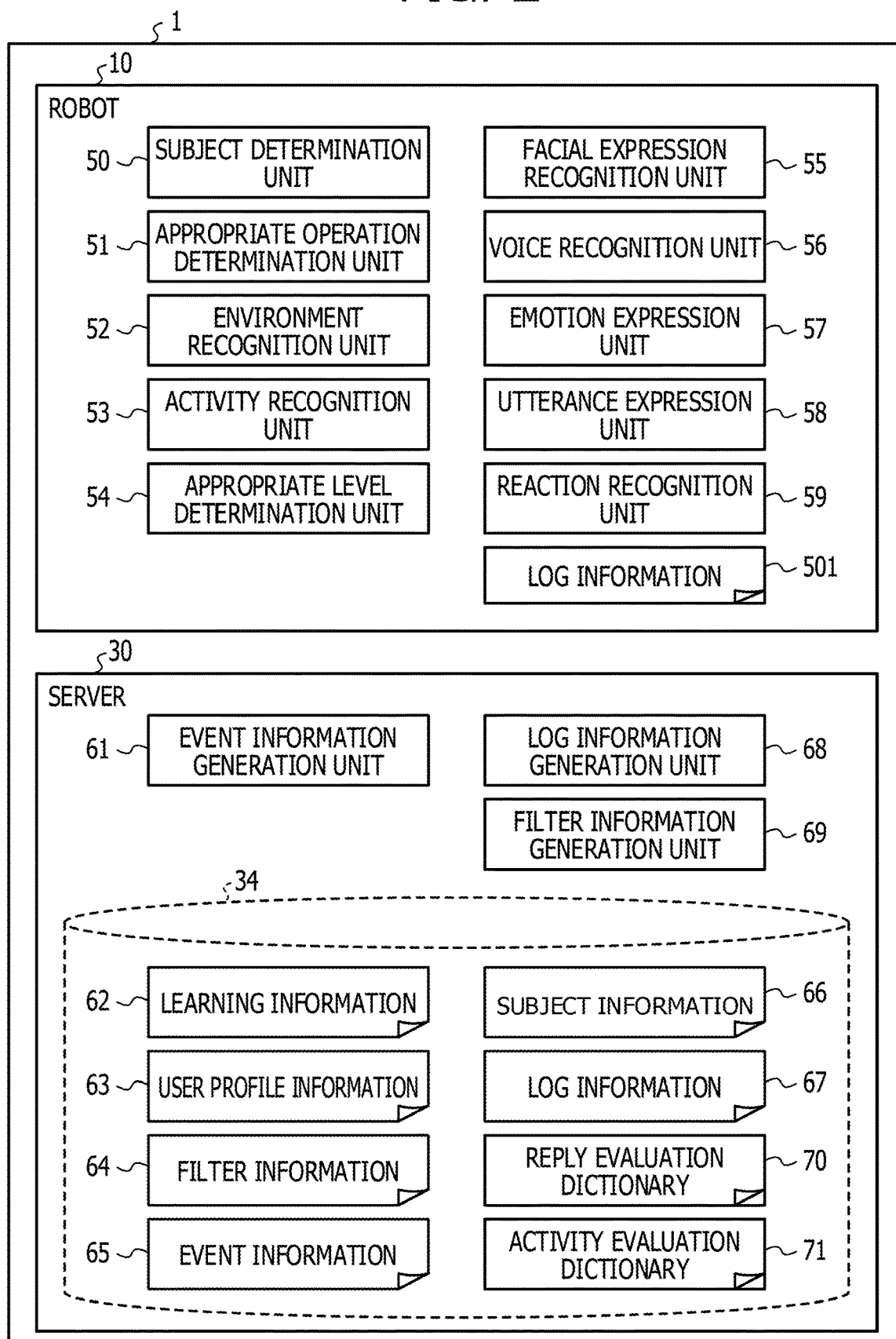
FIG. 2 is a functional block diagram of the robot system as an example of the embodiment.

The functional block of the robot system 1 according to this embodiment is illustrated in FIG. 2.

The server 30 of the robot system 1 has the functions as a log information generation unit 68, an event information generation unit 61, and a filter information generation unit 69. Also, the HDD 34 of the server 30 stores learning information 62, user profile information 63, log information 67, event information 65, filter information 64, subject information 66, a reply evaluation dictionary 70, and an activity evaluation dictionary 71.

First, the log information generation unit 68 included in the server 30 will be described. When the robot 10 starts an operation, the log information generation unit 68 starts to record raw data, and stores the recorded raw data in the later-described log information 67.

Here, the log information 67 generated by the log information generation unit 68 will be described with reference to FIG. 3.

The log information 67 includes the event (activity) conducted by the robot 10, the environmental information of each event, and reactions of users.

The environmental information indicates, for instance, the surrounding environment (situation) of the robot 10, and includes, for instance, date and time information, position information, and the member group at the location.

The reactions of users include, for instance, information indicating replies, activities, and emotions of users for activities of the robot 10. The reactions of users correspond to reaction information which is observed for activities conducted by the robot 10.

Figure 3:
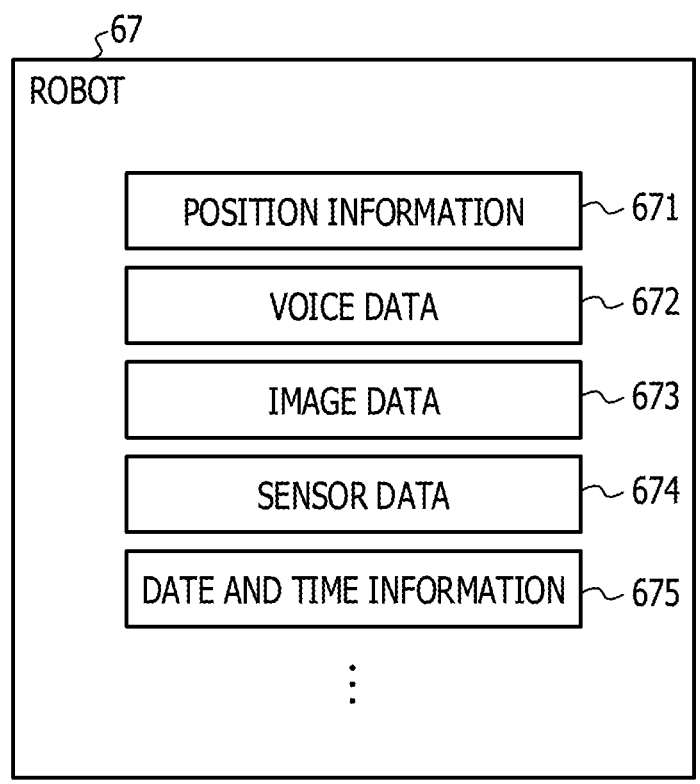
FIG. 3 is a diagram illustrating log information in the robot system as an example of the embodiment.

Specifically, as illustrated in FIG. 3, the log information 67 stores position information 671, voice data 672, image data 673, sensor data 674, and date and time information 675. These pieces of information may be stored in a storage device such as a database in a table format.

The position information 671 is information on a location where the event has occurred, and, for instance, is the position information acquired by the GPS 27 of the robot 10.

The voice data 672 is details of conversation between the robot 10 and a human, and is acquired by the microphone 23 of the robot 10, for instance.

The image data 673 is image data for reflecting a human, and is acquired by the camera 21 of the robot 10, for instance.

The sensor data 674 is various data obtained by a sensor, and is acquired by the sensor 22 of the robot 10, for instance. The sensor data is also used for determining the later-described member group. In order to improve the accuracy of determination of a member group, various sensors may be used in combination.

The date and time information 675 is information on the date and time when the event has occurred, and may be provided to the position information 671, the voice data 672, the image data 673, or the sensor data 674.

When the robot 10 starts an operation, environmental information on communication between the robot 10 and a human is recorded by the log information generation unit 68 as the log information 67. The log information 67 records reactions of a human to an activity of the robot 10, and thus includes information on communication for which a human has felt unpleasant.

Alternatively, the log information generation unit 68 may cause the robot 10 to collect the above-mentioned pieces of information, or the robot 10 may autonomously receive the collected pieces of information.

Subsequently, returning to the description of the functional block diagram of the robot system 1 illustrated in FIG. 2, the event information generation unit 61 included in the server 30 of the robot system 1 will be described.

The event information generation unit 61 extracts information from the log information 67, and generates the later-described event information 65. Specifically, the event information generation unit 61 retrieves log information for each event (each utterance and operation) from the log information 67, and generates the event information 65. The event information 65 may be stored in a storage device such as a database in a table format.

Here, the event information 65 generated by the event information generation unit 61 will be described with reference to FIG. 4.

The event information 65 illustrated in FIG. 4 has an event ID 651, a user ID 652, an occurrence date and time 653, an occurrence location 654, a conversation detail 655, an occurrence environment 656, and image data 657 for each event. Here, as an example, it is assumed that an event table is generated for each event, and each event table has fields for storing the above-mentioned information included in the event information 65.

The event ID 651 is an identification (ID) for uniquely identifying a corresponding event. The example illustrated in FIG. 4 indicates that the event ID is "Robo235-iawajp".

The user ID 652 is for identifying a person with whom the robot 10 has had a conversation, and includes part of the later-described member group 6561. The example illustrated in FIG. 4 indicates that the user ID is "RoboUser".

The occurrence date and time 653 is the date and time at which the event has started. The example illustrated in FIG. 4 indicates that the occurrence date and time of the event is "6 hr 40 min 43 sec on Nov. 25, 2016".

The occurrence location 654 is information on the location where the event has occurred, and is, for instance, the position information obtained by the GPS 27 of the robot 10. Here, the occurrence location of event is set such that at most two locations may be registered for each of public and private, however, the number of occurrence locations may be more than two or less than two. The example illustrated in FIG. 4 indicates that the occurrence location of the event includes "company", "school of a child", "home", and "sport gym". Also, "private" before each occurrence location indicates a private occurrence location, and "public" before each occurrence location indicates a public occurrence location which is not private and may be open to public.

The conversation detail 655 is the details of a conversation between the robot 10 and a user, which are obtained by the microphone 23 of the robot 10. In the example illustrated in FIG. 4, conversations 1 to 4 indicate the details of conversation between the robot 10 and a user. Also, "R" before conversation details indicates a conversation made by the robot 10, "U" before conversation details indicates a conversation made by a user. The conversation detail 655 may be voice data, or data such as a text which is generated by analyzing voice data.

The occurrence environment 656 is information indicating the environment in which the event has occurred. For instance, as the occurrence environment 656, a member group 6561, a sound volume level 6562, and a tone 6563.

The member group 6561 is member information of persons who have participated in the event. The later-described environment recognition unit 52 of the robot 10 identifies each person who has participated in the event, that is, each person on that occasion, and generates information (ID) for identifying these persons. The event information generation unit 61 stores these pieces of information transmitted by the robot 10 as the member group 6561.

The sound volume level 6562 stores a sound volume level of the voice of a person in a conversation between the robot 10 and the person.

The tone 6563 stores a pitch (tone) of the voice of a person in a conversation between the robot 10 and the person.

The sound volume level 6562, and the tone 6563 are also generated by the robot 10, and transmitted to the server 30. The event information generation unit 61 stores these pieces of information transmitted by the robot 10 as the sound volume level 6562, and the tone 6563. The sound volume level 6562 and the tone 6563 are used for determination of an emotion of a user by the later-described voice recognition unit 56 of the robot 10.

The image data 657 is the image data 673 of the event, acquired by the camera 21 of the robot 10, and is stored in the log information 67 by the log information generation unit 68. The event information generation unit 61 may store the image data 673 in the image data 657 of the event information 65, or may store a pointer to the image data 673 in the image data 657 of the event information 65.

Next, specific steps of generating the event information 65 (FIG. 4) including the information described above will be described.

The event information generation unit 61 extracts information desired for generating the event information 65 from the log information 67 of the HDD 34. Specifically, the event information generation unit 61 retrieves log information for each event (each utterance and operation) from the log information 67 of the HDD 34, and generates event information. Here, an example is described, in which one event table is generated for one event, and stored in the event information 65.

The event information generation unit 61 assigns an event ID to each event, and stores the event ID in the event ID 651 of the event table.

The event information generation unit 61 stores information (user ID) in the user ID 652 of the event information 65, the information for identifying a person who has a conversation with the robot. A technique for identifying a person who has had a conversation with the robot is publicly known, and thus a description thereof is omitted.

The event information generation unit 61 acquires the occurrence date and time of the event included in the log information 67 of the HDD 34, and stores the occurrence date and time in the occurrence date and time 653 of the event information 65.

The event information generation unit 61 acquires the position information 671 of the event included in the log information 67 of the HDD 34, and stores the position information 671 in the occurrence location 654 of the event information 65.

The event information generation unit 61 acquires the voice data 672 included in the log information 67 of the HDD 34, extracts the utterance details of the robot 10, and the utterance details of a user, and stores those details in the conversation detail 655 of the event information 65. When utterance is made multiple times, individual details of utterance are extracted and stored.

The event information generation unit 61 registers the sensor data 674 included in the log information 67 of HDD 34, and a member group acquired via the environment recognition unit 52 in the member group 6561 of the event information 65.

The event information generation unit 61 stores the sound volume level of a human extracted by the voice recognition unit 56 into the sound volume level 6562 of the event information 65.

The event information generation unit 61 stores the pitch (tone) of a human extracted by the voice recognition unit 56 into the tone 6563 of the event information 65.

The event information generation unit 61 may acquire the image data 673 included in the log information 67 of the HDD 34 and store the image data 673 in the image data 657 of the event information 65, or may store a pointer to the image data 673 in the image data 657 of the event information 65.

Through the above-mentioned processing, the event information 65 illustrated in FIG. 4 is generated. The generated event information 65 is used for generating the later-described filter information 64 used for robot control.

Next, returning to the description of the functional block diagram of the robot system 1 illustrated in FIG. 2, and the filter information generation unit 69 included in the server 30 of the robot system 1 will be described.

The filter information generation unit 69 extracts the event ID 651, the occurrence location 654, the member group 6561, the conversation detail 655, the sound volume level 6562, the tone 6563, and the image data 657 from the event information 65, and generates the filter information 64. The filter information generation unit 69 corresponds to a control policy generation unit that generates a control policy.

Here, the filter information 64 generated by the filter information generation unit 69 will be described with reference to FIG. 5. The robot 10 uses the filter information 64 for the later-described deterrence and permission of an activity.

Here, as illustrated in FIG. 5, the filter information 64 may be stored in a table format, and in this case, the filter information 64 includes multiple filter tables 641. The filter information 64 corresponds to a control policy. Also, the filter information 64 corresponds to combinations of an activity of the robot and an activity of a human, associated with environmental information.

The filter table 641 illustrated in FIG. 5 has the fields of an event ID 6411, an occurrence location 6412, a member group 6413, a conversation theme 6414, a conversation keyword 6415, a user emotion 6416, and an appropriate level 6417.

The event ID 6411 is an ID for uniquely identifying an event. The example illustrated in FIG. 5 indicates that the event ID is "Robo235-iawajp".

The occurrence location 6412 is information on the location where the event has occurred, and, for instance, is the position information acquired by the GPS 27 of the robot 10. The example illustrated in FIG. 5 illustrates that the occurrence location 6412 is "home".

The member group 6413 is member information of persons who have participated in the event. The member group 6413 may be extracted from the sensor data 674 acquired by the sensor 22 of the robot 10, for instance, or may be acquired via the network 20 based on the identifiers of mobile phones or the like owned by the persons. The example illustrated in FIG. 5 indicates that the member group 6413 is "myself" and "friend A".

The conversation theme 6414 is the theme (category) of a conversation held between the robot 10 and a human, and is extracted, for instance, from the conversation detail 655 of the event information 65 using a publicly known technique.

The example illustrated in FIG. 5 indicates that the conversation theme 6414 is a "schedule".

The conversation keyword 6415 is a keyword included in the conversation held between the robot 10 and a human, and is extracted, for instance, from the conversation detail 655 of the event information 65 using a publicly known technique. The example illustrated in FIG. 5 indicates that the conversation keyword 6415 is "schedule", "tomorrow", "afternoon" and "company".

The user emotion 6416 represents categories of emotions of a human, and is acquired, for instance, from the sound volume level 6562 of the event information 65, the tone 6563, and the image data 657 using a publicly known technique. The user emotion 6416 may indicate one of delight, anger, sorrow, and pleasure. In that case, for instance, when the emotion of a human is anger, "anger" is stored in the user emotion 6416. Alternatively, the user emotion 6416 may store a predetermined numerical value for each of "delight", "anger", "sorrow", and "pleasure". The example illustrated in FIG. 5 indicates that the user emotion 6416 is "anger".

The appropriate level 6417 is information indicating to what extent an activity (utterance) is allowed or to what extent an activity is deterred. The appropriate level 6417 corresponds to the appropriate level information which is set based on a reaction to an activity conducted by the robot 10. In this embodiment, the appropriate level 6417 is expressed by 5-point scale, "1" to "5", and when the appropriate level is "1", utterance is deterred, and when the appropriate level is "5", utterance is allowed, however, the appropriate level 6417 may be expressed by a binary which is "0" or "1", and when the binary is "0", utterance is deterred, and when the binary is "1", utterance is allowed. The example illustrated in FIG. 5 indicates that the appropriate level 6417 is "1".

Next, specific steps of generating the filter information 64 (filter table 641 in FIG. 5) having the above-mentioned information will be described.

Here, as an example, a case will be described, in which the filter information generation unit 69 extracts the event ID 651, the occurrence location 654, the member group 6561, the conversation detail 655, the sound volume level 6562, the tone 6563, and the image data 657 from the event information 65 of the HDD 34, and generates the filter information 64 based on these pieces of information. It is assumed that the filter information 64 is constructed in a table format. Also, the robot 10 uses the filter information 64 for the later-described deterrence and permission of an activity.

The filter information generation unit 69 acquires the event ID 651 stored in the event information 65, and stores the event ID 651 in the event ID 6411 of the filter table 641.

The filter information generation unit 69 acquires the occurrence location 654 stored in the event information 65, and stores the occurrence location 654 in the occurrence location 6412.

The filter information generation unit 69 acquires the member group 6561 stored in the event information 65, and stores the member group 6561 in the member group 6413.

The filter information generation unit 69 acquires the conversation detail 655 stored in the event information 65, extracts a conversation theme, and stores the conversation theme in the conversation theme 6414. A technique for extracting a conversation theme is publicly known, and thus a description thereof is omitted.

The filter information generation unit 69 acquires the conversation detail 655 stored in the event information 65, extracts a conversation keyword, and stores the conversation keyword in the conversation keyword 6415. A technique for extracting a conversation keyword is publicly known, and thus a description thereof is omitted.

The filter information generation unit 69 acquires the sound volume level 6562 and the tone 6563 of the event information 65, determines an emotion of a user, and stores the emotion in the user emotion 6416. A technique for determining the emotion of a human from the voice, or converting each emotion of delight, anger, sorrow, and pleasure into a numerical value is publicly known, and thus a description thereof is omitted. Alternatively, the filter information generation unit 69 may acquire and analyze the image data 657 of the event information 65, or image data stored in the image data 673 of the event information 65, and may determine the emotion of a user. A technique for analyzing the emotion of a human based on images and converting the emotion of delight, anger, sorrow, and pleasure into a numerical value is publicly known, and thus a description thereof is omitted.

The filter information generation unit 69 sets the appropriate level 6417 based on the reply evaluation dictionary 70 and the activity evaluation dictionary 71. The setting processing of the appropriate level 6417 in the filter information generation unit 69 will be specifically described below.

For setting the appropriate level 6417, the filter information generation unit 69 evaluates each of the detail of reply (utterance as a reaction) of a user for utterance of the robot 10, an activity of a user (activity as a reaction), a facial expression of a user (facial expression as a reaction), and the voice of a user (voice as a reaction).

Figure 6A:
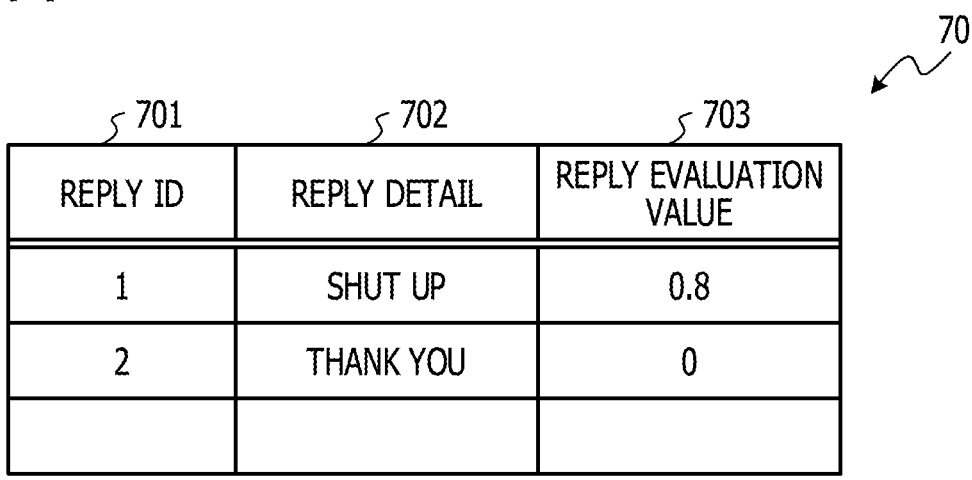
FIG. 6A is a diagram illustrating a reply evaluation dictionary in the robot system as an example of the embodiment.
Figure 6B:
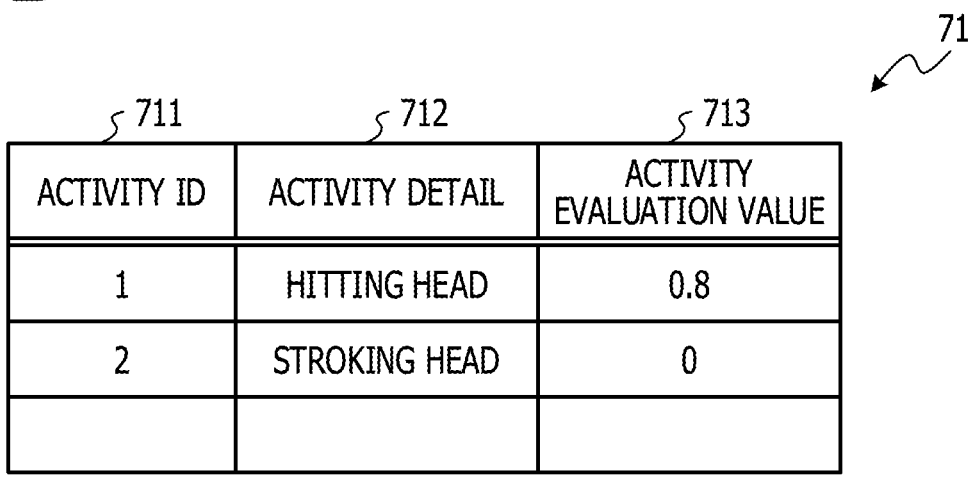
FIG. 6B is a diagram illustrating an activity evaluation dictionary in the robot system as an example of the embodiment.

FIG. 6A is a diagram illustrating a reply evaluation dictionary 70 in the robot system 1 as an example of the embodiment, and FIG. 6B is a diagram illustrating an activity evaluation dictionary 71 in the robot system 1 as an example of the embodiment. FIGS. 6A and 6B respectively illustrate the reply evaluation dictionary 70 and the activity evaluation dictionary 71 constructed in a table format.

In this embodiment, the detail of reply (utterance as a reaction) of a user is evaluated using the reply evaluation dictionary 70 illustrated in FIG. 6A, and a reply evaluation value of a user is calculated. Thus, whether the detail of reply of a user indicates something for which the user feels unpleasant (negative), or something for which the user feels not unpleasant (positive) is evaluated.

When reply is returned from a user for the utterance of the robot 10, in order to evaluate to what extent a user has felt unpleasant based on the details of the reply from a user, the utterance of a user for the utterance of the robot 10 is retrieved from the voice data 672 included in the log information 67 by the voice recognition unit 56. Each keyword included in the retrieved utterance of a user (voice data) is to be extracted.

Here, as an example, a scenario is assumed in which the robot 10 presents a subject inappropriate to the surrounding environment (situation), and for the presented subject, a user hits the robot 10 on the head with angry face and yells "shut up" in loud angry voice.

It is assumed that "shut up", which is the detail of reply of a user, is retrieved from the voice data 672 included in the log information 67 using a publicly known technique by the voice recognition unit 56. Then a publicly known technique is used for the detail of reply, and "shut up" which is a keyword of reply is extracted.

The appropriate level determination unit 54 makes a search to see whether the keyword ("shut up") of reply is registered in the reply evaluation dictionary 70.

The reply evaluation dictionary 70 illustrated in FIG. 6A indicates a correspondence relationship between a reply detail 702 of a human and a reply evaluation value 703.

Here, the reply evaluation dictionary 70 has fields of a reply ID 701, a reply detail 702, and a reply evaluation value 703.

The reply ID 701 identifies the relationship between the reply detail 702 and the reply evaluation value 703, and one reply ID 701 is to be assigned to one reply detail 702.

The reply detail 702 stores information on the details of reply of a user for an utterance of the robot 10. Here, each keyword included in the details of reply of a user is stored in the reply detail 702. The reply detail 702 preferably pre-store multiple keywords included in typical replies, and updates the keywords as appropriate. Here, as illustrated in FIG. 6A, it is assumed that "shut up" and "thank you" are registered as the reply detail 702.

The reply evaluation value 703 stores an evaluation value for the reply detail 702. Here, the evaluation value indicates a degree of inclusion of a negative element in the utterance of a user for the utterance of the robot 10, in other words, a degree of unpleasant feeling for the utterance of the robot 10. As an example, the reply evaluation value 703 is represented by a value between "0" and "1" both inclusive. Specifically, the closer the reply evaluation value 703 is to "1", it is evaluated that the more unpleasant feeling is felt by a user, and the closer the reply evaluation value 703 is to "0", it is evaluated that the less unpleasant feeling is felt by a user. In the example of FIG. 6A, when the reply detail 702 is "shut up", the reply evaluation value 703 is set to "0.8", and when the reply detail 702 is "thank you", the reply evaluation value 703 is set to "0".

Alternatively, reference information, in which various keywords are each associated with a reply evaluation value 703, is prepared, and the reply evaluation value 703 may be set based on the reference information. Alternatively, the reply evaluation value 703 may be set by a user or a system administrator in any manner.

In the above-mentioned scenario as an example, the appropriate level determination unit 54 makes a search to see whether "shut up" is registered in the above-mentioned reply detail 702 of the reply evaluation dictionary 70.

Since information with the reply detail 702 of "shut up" is registered for the reply ID=1 of the reply evaluation dictionary 70, the reply evaluation value 703, "0.8" for the reply detail 702 of "shut up" is acquired by the appropriate level determination unit 54.

Next, in this embodiment, activity detail of a user is evaluated, and an activity evaluation value of the user is calculated using the activity evaluation dictionary 71 illustrated in FIG. 6B. Thus, whether the activity detail of a user indicates something for which the user feels unpleasant (negative), or something for which the user feels not unpleasant (positive) is evaluated.

In order to evaluate to what extent a user feels unpleasant based on the activity detail of the user, the detail of activity (activity as a reaction) of a user for utterance of the robot 10 is retrieved from the image data 673 included in the log information 67 by an activity recognition unit 53, and an activity is to be identified based on the retrieved detail of activity of the user.

In the above-mentioned scenario as an example, in the case where a user hits the robot 10 on the head for the subject presented by the robot 10, an activity detail of the user for utterance of the robot 10 is retrieved from the image data 673 included in the log information 67 using a publicly known technique by the activity recognition unit 53, it is identified that the activity of the user is "hitting the head".

The appropriate level determination unit 54 makes a search to see whether the activity of the user is registered in the activity evaluation dictionary 71.

The activity evaluation dictionary 71 illustrated in FIG. 6B indicates a correspondence relationship between an activity detail 712 of a human and an activity evaluation value 713.

The activity evaluation dictionary 71 has fields of an activity ID 711, an activity detail 712, and an activity evaluation value 713.

The activity ID 711 identifies the correspondence relationship between the activity detail 712 of a human and the activity evaluation value 713, and one activity ID 711 is to be assigned to one activity detail 712.

The activity detail 712 stores information on an activity (activity as reaction) conducted by a user for an utterance of the robot 10. The activity detail 712 of the activity evaluation dictionary 71 preferably pre-store typical activities (activities as reactions), and updates the typical activities as appropriate. Here, as illustrated in FIG. 6B, it is assumed that "hitting the head" and "stroking the head" are registered as the activity detail 712.

The activity evaluation value 713 stores an evaluation value for each activity detail 712. Here, as described above, the evaluation value indicates a degree of inclusion of a negative element in the utterance of a user for the utterance of the robot 10, in other words, a degree of unpleasant feeling for the utterance of the robot 10. As an example, the activity evaluation value 713 is represented by a value between "0" and "1" both inclusive. Specifically, the closer the activity evaluation value 713 is to "1", it is evaluated that the more unpleasant feeling is felt by a user, and the closer the activity evaluation value 713 is to "0", it is evaluated that the less unpleasant feeling is felt by a user. In the example of FIG. 6B, when the activity detail 712 is "hitting the head", the activity evaluation value 713 is set to "0.8", and when the activity detail 712 is "stroking the head", the activity evaluation value 713 is set to "0".

Alternatively, reference information, in which various activities are each associated with an activity evaluation value 713, is prepared, and the activity evaluation value 713 may be set based on the reference information. Alternatively, the activity evaluation value 713 may be set by a user or a system administrator in any manner.

In the above-mentioned scenario as an example, the appropriate level determination unit 54 makes a search to see whether the activity of a user in the scenario, that is, "hitting the head" is registered in the activity evaluation dictionary 71.

Since "hitting the head" is registered for the activity ID=1 in the activity evaluation dictionary 71, the activity evaluation value 713, "0.8" for the activity detail is acquired by the appropriate level determination unit 54.

Subsequently, the facial expression of a user (facial expression as a reaction), and the voice of a user (voice as a reaction) as reactions of a user are evaluated, and an emotion value is calculated.

The facial expression (facial expression as a reaction) of a user for the utterance of the robot 10 is evaluated by an expression recognition unit 55 and the voice of a user (voice as a reaction) is evaluated by the voice recognition unit 56. Here, in order to evaluate the facial expression of a user, and the voice of a user, the image data 673 including the facial expression of a user for the utterance of the robot 10, and a sound volume level and a tone acquired from the voice of a user for the utterance of the robot 10 are used. Here, a publicly known technique is used to evaluate the facial expression of a user and the voice of a user, and a degree of each emotion of delight, anger, sorrow, and pleasure, as the emotion of a user is determined. Specifically, each of "delight", "anger", "sorrow", and "pleasure" is assigned an emotion value having a value between "0" and "1" both inclusive, and the closer the emotion value is to "1", it is evaluated that the more unpleasant feeling is felt by a user, and the closer the emotion value is to "0", it is evaluated that the less unpleasant feeling is felt by a user.

In this embodiment, the expression recognition unit 55 and the voice recognition unit 56 calculate an emotion value of each of "delight" and "pleasure" which are positive (indicating not unpleasant) emotions among the "delight", "anger", "sorrow", and "pleasure".

In the above-mentioned scenario, a positive emotion value (an emotion value of each of "delight" and "pleasure") of a user for the utterance of the robot 10 is calculated using a publicly known technique based on the facial expression of a user and the voice of a user. In the above-mentioned scenario, an emotion value of each of "delight" and "pleasure" is acquired using a publicly known technique based on "angry face" (facial expression) of a user and "loud angry voice" (voice) of a user. Here, it is assumed that "0.2" is acquired as the emotion value of "delight" and "0.2" is acquired as the emotion value of "pleasure".

Subsequently, the expression recognition unit 55 and the voice recognition unit 56 calculate an emotion value of each of "anger" and "sorrow" which are negative (indicating unpleasant) emotions among the "delight", "anger", "sorrow", and "pleasure".

In the above-mentioned scenario, a positive emotion value (an emotion value of each of "anger" and "sorrow") of a user for the utterance of the robot 10 is calculated using a publicly known technique based on the facial expression of a user and the voice of a user. In the above-mentioned scenario, an emotion value of each of "anger" and "sorrow" is acquired using a publicly known technique based on "angry face" (facial expression) of a user and "loud angry voice" (voice) of a user. Here, it is assumed that "0.8" is acquired as the emotion value of "anger" and "0.8" is acquired as the emotion value of "sorrow".

Subsequently, the appropriate level determination unit 54 calculates a degree of negative (indicating unpleasant) emotion as the entire emotion (comprehensive emotion value) of a user by using the reply evaluation value 703, the activity evaluation value 713, an average value of the positive emotion values (the emotion values of "delight" and "pleasure"), and an average value of the negative emotion values (the emotion values of "anger" and "sorrow").

Since (the average value) of the emotion values of "delight" and "pleasure" is a degree indicating positive emotion, when in the calculation of the above-mentioned comprehensive emotion value (a degree indicating negative emotion), instead of (the average value of) the emotion values of "delight" and "pleasure", a value obtained by subtracting the average value from "1" is used.

In this embodiment, a comprehensive emotion value is calculated using the calculated evaluation values and emotion values. In the above-mentioned scenario, a degree of negative (indicating unpleasant) emotion as the entire emotion (comprehensive emotion value) of a user is calculated using "0.8" as the reply evaluation value 703, "0.8" as the activity evaluation value 713, "0.2" as the average value of the emotion values of "delight" and "pleasure", and "0.8" as the average value of the emotion values of "anger" and "sorrow". As described above, for the average value of the emotion values of "delight" and "pleasure", a value obtained by subtracting the average value from "1" is used. This is because the emotion values of "delight" and "pleasure" indicate a positive emotion, whereas in a comprehensive emotion value, and calculation of a comprehensive emotion value, a degree of negative emotion is determined. Specifically, in the above-mentioned scenario, "0.8" as the value of the reply evaluation value 703, "0.8" as the activity evaluation value 713, "0.8" which is obtained by subtracting "0.2" as the average value of the emotion values of "delight" and "pleasure" from "1", and "0.8" as the average value of the emotion values of "anger" and "sorrow" are multiplied together, and the product "0.41" gives a comprehensive emotion value.

In this manner, the reply detail of a user, the activity detail of a user, and negative evaluation values and emotion values for each of the facial expression and the voice of a user are multiplied together, and a comprehensive emotion value is calculated.

Subsequently, the above-mentioned comprehensive emotion value is normalized (standardized) using a ceiling function (ceil (5*comprehensive emotion value)), and the normalized value is determined as an appropriate level by the appropriate level determination unit 54. In this embodiment, the appropriate level is to be normalized to a range of 1 to 5. In other words, the appropriate level calculated here indicates to what extent a reaction of a user to the robot 10 is negative. The appropriate level calculated here is stored in the appropriate level 6417 of the filter table 641 illustrated in FIG. 5.

In the above-mentioned scenario, "2", which is a value obtained by using a ceiling function for the comprehensive emotion value of "0.41", is calculated as the appropriate level.

When the above-mentioned scenario is registered in the filter table 641 of the filter information 64, the calculated appropriate level ("2") is stored in the appropriate level 6417 of the filter table 641.

Through such processing, the appropriate level 6417 is set by the filter information generation unit 69, and the filter information 64 (filter table 641) having the appropriate level 6417 is generated.

The filter information 64 generated in this manner is used for the later-described robot control. Also, the appropriate level 6417 is stored in connection with each communication between the robot 10 and a human in the filter information generation unit 69, and when the same situation as in the past occurs, an activity which is intended to be conducted by the robot 10 may be controlled. An activity which is intended to be conducted by the robot 10 corresponds to a scheduled activity which is scheduled to be conducted by the robot 10.

As an example, the filter table 641 illustrated in FIG. 5 indicates a situation in which when the robot 10 talks about a tomorrow schedule for a company while I (myself) and friend A staying at my home, I or friend A has an angry reaction, and thus the appropriate level is set to 1. The filter table 641 makes it possible to deter presentation of a similar subject by the robot 10 in the case where the same environment occurs later.

Next, the learning information 62, the user profile information 63, the subject information 66, the reply evaluation dictionary 70, and the activity evaluation dictionary 71 stored in the HDD 34 illustrated in FIG. 2 will be described.

The subject information 66 stores subjects presented by the robot 10. Here, in the later-described subject determination unit 50 of the robot 10, a subject provided to a user is autonomously determined from the subject stored in the subject information 66 by the robot 10.

The user profile information 63 analyzes information on users for each user based on an organization to which the user belongs, and an activity history in the past. The user profile information 63 is, for instance, information on preference, information on life area, or information on organization to which each user belongs, and these pieces of information are provided for each user.

The learning information 62 is the information provided in a typical robot, and is acquired using an algorithm such as machine learning from experiences in the past.

The reply evaluation dictionary 70 is the reply evaluation dictionary 70 illustrated to FIG. 6A, and may be constructed in a table format, for instance.

The activity evaluation dictionary 71 is the activity evaluation dictionary 71 illustrated to FIG. 6B, and may be constructed in a table format, for instance.

Next, the block diagram of the robot 10 of the robot system 1 illustrated in FIG. 2 will be described.

The controller 11 of the robot 10 has the functions as the subject determination unit 50, the environment recognition unit 52, the voice recognition unit 56, the activity recognition unit 53, the facial expression recognition unit 55, the appropriate level determination unit 54, an appropriate operation determination unit 51, a reaction recognition unit 59, an emotion expression unit 57, and an utterance expression unit 58. Also, log information 501 is stored in the memory 15 of the robot 10.

The subject determination unit 50 determines a subject to be presented to a user by the robot 10. Although the subject determination unit 50 determines a subject in this embodiment, the subject determination unit 50 may determine multiple subjects. A subject is determined by the subject determination unit 50, thereby making it possible for the robot 10 to autonomously present a subject to a user. The subject determination unit 50 determines a subject from the subject information 66 stored in the HDD 34 of the server 30 based on the current time and the user profile information 63 in the HDD 34. When a subject is determined based on the user profile information 63, the subject determination unit 50 may acquire, for instance, the later-described member group 6561 via the later-described environment recognition unit 52, and when the user profile information 63 for a person included in the acquired member group 6561 is registered, may determine a subject based on the user profile information 63. A technique for determining a subject based on the current time and the user profile information 63 is publicly known, and thus a description thereof is omitted. The subject determination unit 50 corresponds to a schedule activity determination unit that determines a scheduled activity of the robot 10.

The environment recognition unit 52 acquires information on the surrounding environment (situation) of the robot 10. Here, information on the member group at the location and information on the current position are acquired as the environmental information. The environment recognition unit 52 acquires a member group based on sensor data acquired by the sensor 22, for instance, or acquires a member group by acquiring the identifiers of mobile phones or the like owned by the participants via the network 20. Also the environment recognition unit 52 obtains the information on the current position acquired by the GPS 27, for instance. The environment recognition unit 52 corresponds to an acquisition unit that acquires the environmental information on the surrounding environment of the robot 10.

The appropriate operation determination unit 51 acquires environmental information from the environment recognition unit 52, and determines whether a subject determined by the subject determination unit 50 is appropriate to the surrounding environment (situation) of the robot 10, specifically, the current position (the current location) and the member group. When it is determined that the subject determined by the subject determination unit 50 is inappropriate to the surrounding environment of the robot 10, the appropriate operation determination unit 51 deters the activity of the robot 10 which has determined the subject is inappropriate. Also, the appropriate operation determination unit 51 corresponds to a deterrence control unit that deters execution of a scheduled activity.

The voice recognition unit 56 retrieves an utterance of a user for the utterance of the robot 10, for instance, from the log information 501 included in the robot 10, extracts each keyword included in, for instance, the retrieved utterance (voice data) of the user, and outputs the keyword to the later-described appropriate level determination unit 54. A technique (such as voice recognition) for retrieving a desired voice from the voice data, or extracting a keyword included in the voice data is publicly known, and thus a description thereof is omitted.

From the retrieved voice data of a user, the voice recognition unit 56 analyzes a sound volume level and a tone in the voice. A degree of each emotion of delight, anger, sorrow, and pleasure, as the emotion of a user is determined from the analyzed sound volume level and tone.

The activity recognition unit 53 retrieves an activity (activity as a reaction) of a user for the utterance of the robot 10, for instance, from the log information 501 included in the robot 10, and identifies an activity from the retrieved activity (image data) of a user. A technique (such as image recognition) for retrieving a desired image from the image data, or identifying an activity included in the image data is publicly known, and thus a description thereof is omitted. It is to be noted that an activity may be identified based on the voice of a user included in the log information 501, or sensor data acquired by the sensor 22.

The facial expression recognition unit 55 retrieves a facial expression (facial expression as a reaction) of a user for the utterance of the robot 10, for instance, from the log information 501 included in the robot 10, and extracts the emotion of the user from the retrieved facial expression (image data) of the user.

The data outputted from the voice recognition unit 56, the activity recognition unit 53, and the facial expression recognition unit 55 is for evaluating the reaction of a user to a subject which is autonomously determined and presented by the robot 10. The data outputted from the voice recognition unit 56, the activity recognition unit 53, and the facial expression recognition unit 55 is inputted to the later-described appropriate level determination unit 54, and is used for calculating an appropriate level.

The appropriate level determination unit 54 calculates an appropriate level by using each keyword included in the voice data extracted by the voice recognition unit 56, the activity of a user identified by the activity recognition unit 53, each emotion value ("0" to "1") of "delight", "anger", "sorrow", and "pleasure" calculated by the facial expression recognition unit 55 based on the facial expression of a user, and each emotion value ("0" to "1") of "delight", "anger", "sorrow", and "pleasure" calculated by the voice recognition unit 56 based on the voice (sound volume level and tone) of the user.

The appropriate level in this embodiment is an index indicating a degree of negative (indicating unpleasant) emotion as the entire emotion (comprehensive emotion value) of a user for a subject which is autonomously determined and presented by the robot 10.

Also, the appropriate level determination unit 54 calculates a comprehensive emotion value based on a predetermined calculation using the data outputted from the voice recognition unit 56, the activity recognition unit 53, and the facial expression recognition unit 55, normalizes the calculated comprehensive emotion value to a range of 1 to 5 using a ceiling function for the calculated comprehensive emotion value, and calculates the normalized value as the appropriate level.

The voice recognition unit 56, the activity recognition unit 53, the facial expression recognition unit 55, and the appropriate level determination unit 54 function after a communication is held between the robot 10 and a human. Specifically, the voice recognition unit 56, the activity recognition unit 53, the facial expression recognition unit 55, and the appropriate level determination unit 54 function to evaluate a reaction of a human to an activity conducted (subject provided) by the robot 10, and to determine whether the activity conducted by the robot 10 (the subject presented by the robot) is something for which the human feels unpleasant or something for which the human feels not unpleasant.

In contrast, the subject determination unit 50, the environment recognition unit 52, and the appropriate operation determination unit 51 function before a communication is held between the robot 10 and a human. Specifically, the subject determination unit 50 and the environment recognition unit 52 function to cause the robot 10 provide a subject to a human in order to create an opportunity of a communication with the human. The appropriate operation determination unit 51 functions to deter or control the activity of the robot 10 determined by the subject determination unit 50 and the environment recognition unit 52, based on the appropriate level.

After a human exhibits some reaction to the subject provided by the robot 10 (when reaction is not exhibited at all, it is determined that no reaction is exhibited), a reaction recognition unit 59, an emotion expression unit 57, and an utterance expression unit 58, which will be described below, are supposed to function.

The reaction recognition unit 59 acquires information on the reaction of a human to the subject provided by the robot 10 from the voice recognition unit 56, the activity recognition unit 53, and the facial expression recognition unit 55, and calculates the emotion of a user who reacts by using each emotion value ("0" to "1") of "delight", "anger", "sorrow", and "pleasure". A technique for calculating an emotion value from the voice, the activity, and the facial expression of a user is as described above.

Also, the reaction recognition unit 59 has multiple activities to be conducted by the robot 10 to a reaction of a user as rules. As a rule, the reaction recognition unit 59 stores the utterance and emotional expression of the robot 10 for a reaction of a user, for instance, when the emotion value of "anger" among the emotions of a user is at least "0.8", stores "Say I'm sorry and bow", and when the emotion value of "delight" among the emotions of a user is at least "0.8", stores "smile sweetly".

The emotion expression unit 57 generates a control signal for controlling the actuator 24 and the display 26, and outputs the control signal to the actuator 24 and the display 26. For instance, when an activity of "bowing" is desired to be conducted by the robot 10, a driving signal desirable for motion control for "bowing" is sent to the actuator 24. Also, when an activity of "smile sweetly" is desired to be conducted by the robot 10, a driving signal desirable for display control to display "sweetly smile" face is sent to the display 26.

The utterance expression unit 58 generates a control signal for controlling the speaker 25, and outputs the control signal to the speaker 25. For instance, when an activity of utterance "I'm sorry" is desired to be conducted by the robot 10, a driving signal desirable for output control to utter "I'm sorry" is sent to the speaker 25.

In this manner, after the communication between the robot 10 and a human is completed, or strictly speaking, after some reaction of a human to the activity of the robot 10 is obtained, the reaction recognition unit 59, the emotion expression unit 57, and the utterance expression unit 58 function. Therefore, the reaction recognition unit 59, the emotion expression unit 57, and the utterance expression unit 58 function to determine a reaction from a human, and perform follow-up such as apologizing or appreciating for a human.

Also, the log information 501 stores communication between a human and the robot 10, and environmental information which are acquired via the camera 21, the sensor 22, the microphone 23, and the GPS 27 of the robot 10. The log information 501 includes, for instance, position information, voice data, image data, sensor data, and date and time information. The log information 501 may be transmitted to the server 30 via a network, or may be stored as the log information 67 of the HDD 34 of the server 30.

[3. Flowchart Illustrating Generation Processing of Log Information, Event Information, and Filter Information]

Figure 7:
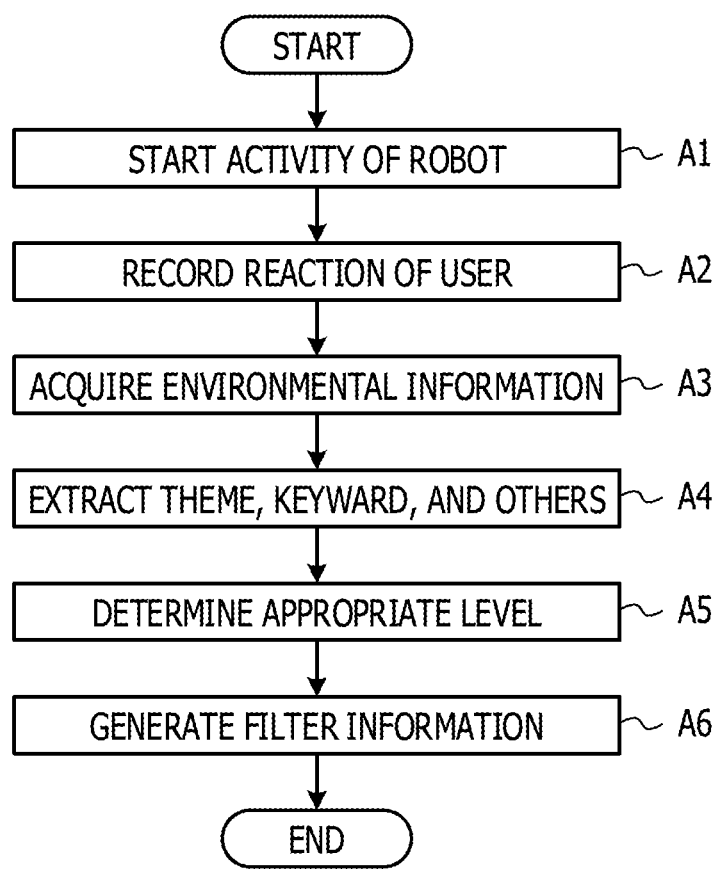
FIG. 7 is a flowchart for explaining the processing of generating log information, event information, and filter information in the robot system as an example of the embodiment.

The generation processing of the log information 67, the event information 65, and the filter information 64 in the robot system 1 as an example of the embodiment will be described in accordance with the flowchart (steps A1 to A6) illustrated in FIG. 7.

Before the start of the processing, the subject determination unit 50 of the robot 10 determines a subject to be presented to a user.

In step A1, the robot 10 starts an activity (activity, utterance). For instance, a driving signal is transmitted to the actuator 24 so that the utterance expression unit 58 outputs voice and the emotion expression unit 57 performs an operation according to the utterance detail. Also, the emotion expression unit 57 transmits a display control signal to the display 26 so that an image is displayed according to the utterance detail.

In step A2, robot 10 collects responses (reactions) of a user to the utterance, and records the reactions in the log information 501. For instance, the voice of a user is recorded using the microphone 23 and the activity of a user is recorded using the camera 21. Through these processing, a reply and an activity by a user and the emotion of a user are detected.

In step A3, the environment recognition unit 52 of the robot 10 acquires the information on the surrounding environment (situation) of the robot 10. The environment recognition unit 52 records the sound in the surrounding using the microphone 23, and records the image in the surrounding using the camera 21, for instance. Also, the position information of the robot 10 is acquired using the GPS 27, and the person member in the surrounding of the robot 10 is acquired using the sensor 22.

Through these processing, the information such as the location of the robot 10 and persons is in the surrounding is acquired. Also, a time is also acquired based on an internal clock (not illustrated) provided in the robot 10 and attribute information included in acquired images. These pieces of acquired information are recorded in the log information 501.

Also, the log information 501 is transmitted to the server 30, and is stored as the log information 67.

In step A4, the robot 10 extracts a theme or a keyword based on the log information 501. For instance, the voice recognition unit 56 retrieves an utterance of a user for the utterance of the robot 10 from the voice data included in the log information 501, extracts each keyword included in, for instance, the retrieved utterance (voice data) of the user.

Also, the activity recognition unit 53 retrieves an activity (activity as a reaction) of a user for the utterance of the robot 10 from the image data included in the log information 501, and identifies an activity from the retrieved activity (image data) of a user. In addition, the facial expression recognition unit 55 retrieves a facial expression (facial expression as a reaction) of a user for the utterance of the robot 10 from the image data included in the log information 501, and extracts the emotion of the user from the retrieved facial expression (image data) of the user.

In step A5, the appropriate level determination unit 54 of the robot 10 determines an appropriate level for the activity conducted by the robot 10 in step A1 based on the log information 501. Thus, it is determined whether the activity conducted by the robot 10 is appropriate.

In step A6, for the activity conducted by the robot 10 in step A1, the log information generation unit 68 of the server 30 generates the log information 67, the event information generation unit 61 of the server 30 generates the event information 65, and the filter information generation unit 69 generates the filter information 64. Generation of these pieces of information in the server 30 may be started in response to transmission of a generation instruction from the robot 10. Autonomous start of generation of the information by the server 30 may be triggered by transmission of the log information 501 from the robot 10. The generated event information 65 and filter information 64 are saved in a database of the server 30 to allow reference. Subsequently, the processing is completed.

In this manner, the log information generation unit 68, the event information generation unit 61, and the filter information generation unit 69 in the server 30 start to function after the robot 10 performs an activity.

Also, the processing in the above-mentioned steps A1 to A6 is performed every time the robot 10 conducts an activity (event), that is, every time an event occurs. Therefore, every time an event occurs in the robot 10, the log information 501, 67 and the event information 65 are updated, and accordingly, the filter information 64 is also updated as appropriate.

[4. Processing of Appropriate Level Determination Unit]

Figure 8:
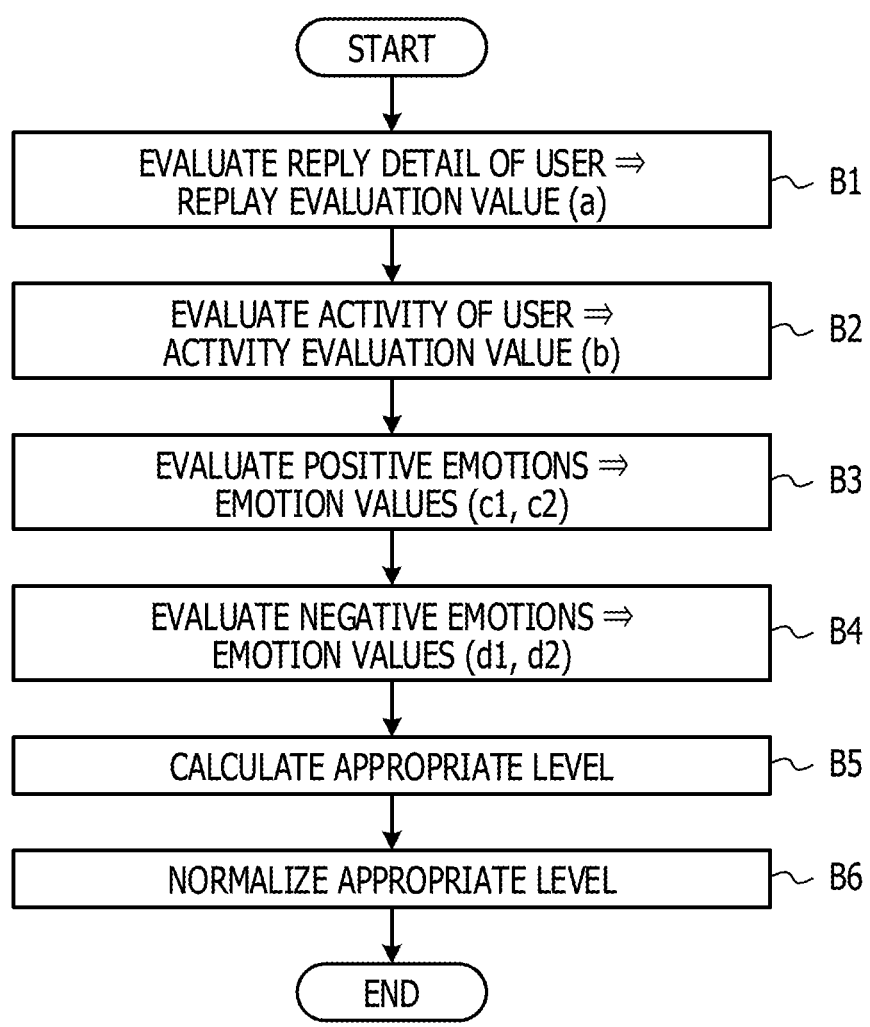
FIG. 8 is a flowchart for explaining the processing performed by appropriate level determination unit in the robot system as an example of the embodiment.

Next, the processing of the appropriate level determination unit 54 in the robot system 1 as an example of the embodiment will be described in accordance with the flowchart (steps B1 to B6) illustrated in FIG. 8.

In step B1, the appropriate level determination unit 54 evaluates the reply detail (utterance as reaction) of a user to the activity (utterance) of the robot 10. Specifically, the appropriate level determination unit 54 evaluates the reply detail of a user by calculating the reply evaluation value (a) of a user using the reply evaluation dictionary 70.

In step B2, the appropriate level determination unit 54 evaluates whether the activity conducted by a user indicates something for which the user feels unpleasant (negative), or something for which the user feels not unpleasant (positive). The appropriate level determination unit 54 sets an activity evaluation value (b) to the user activity.

In step B3, the appropriate level determination unit 54 evaluates (positive emotion evaluation) detection values of positive emotions ("delight", "pleasure") for the activity conducted by a user. The appropriate level determination unit 54 sets an emotion value of "delight" (c1), and an emotion value of "pleasure" (c2).

In step B4, the appropriate level determination unit 54 evaluates (negative emotion evaluation) detection values of negative emotions ("anger", "sorrow") for the activity conducted by a user. The appropriate level determination unit 54 sets an emotion value of "anger" (d1), and an emotion value of "sorrow" (d2).

In step B5, the appropriate level determination unit 54 calculates an appropriate level based on the reply evaluation value (a), the activity evaluation value (b), and the emotion values (c1, c2, d1, d2) set in the above-mentioned steps B1 to B4.

In step B6, the appropriate level determination unit 54 normalizes the appropriate level calculated in step B5, and completes the processing.

[5. Flowchart for Control]

Next, a control method for the robot 10 in the robot system 1 as an example of the embodiment will be described in accordance with the flowchart (steps C1 to C10) illustrated in FIG. 9.

In step C1, the robot 10 determines an activity to be conducted by itself. For instance, the subject determination unit 50 determines a subject to be presented to a user. Here, as an example, it is assumed that the robot 10 determines "snowboard" as the subject presented in a conference room A of a company.

In step C2, the environment recognition unit 52 of the robot 10 acquires a person member and position information as the environmental information using the camera 21, the sensor 22, the microphone 23, and the GPS 27. In the example described above, it is assumed that "chief A", "boss C", "myself", and "friend A" are acquired as person members by the sensor 22. Also it is assumed that "conference room A" is acquired as the position information by the GPS 27.

In step C3, the appropriate operation determination unit 51 refers to the filter information 64 based on the environmental information acquired in step C2, and extracts the filter information 64 corresponding to the environmental information. In the example described above, the appropriate level determination unit 54 extracts all filter information 64 in which the occurrence location 6412 is "conference room" or "conference room A", and all filter information 64 in which the member group 6413 is "chief A", "boss C", "myself", and "friend A" based on the environmental information acquired in step C2.

In step C4, the appropriate operation determination unit 51 determines whether the appropriate level 6417 is greater than a predetermined threshold (for instance, "3") in the filter information 64 extracted in step C3. In this embodiment, when there is no filter information 64 in which the appropriate level 6417 is less than a predetermined threshold, the flow proceeds to step C5.

On the other hand, the appropriate level 6417 is greater than a predetermined threshold in step C4 (see TRUE route in step C4), the flow proceeds to step C5.

In step C5, the appropriate operation determination unit 51 permits the activity determined in step C1, and the robot 10 conducts the activity. For instance, when myself and friend A are at home (of myself), and friend A has a hobby of "snowboard", the robot 10 may be permitted to present a subject of "snowboard".

In step C6, the reaction recognition unit 59 acquires the reaction of a user to the activity conducted by the robot 10. The appropriate level determination unit 54 determines an appropriate level of the activity conducted by the robot 10 based on the reaction of a user.

In step C7, the emotion expression unit 57 and the utterance expression unit 58 conduct a response activity according to the appropriate level determined in step C6.

In step C8, it is determined whether the activity conducted by the robot 10 in step C5 is a new activity by the robot 10. Specifically, the appropriate level determination unit 54 makes a search to see whether the activity conducted by the robot 10 in step C5 is registered in the filter information 64.

As a result of checking in step C8, when the activity conducted by the robot 10 in step C5 is not new (see NO route in step C8), the flow proceeds to step C9.

In step C9, the appropriate operation determination unit 51 checks to see whether the appropriate level determined in step C6 is different from the value of the appropriate level 6417 of the activity in the filter information 64, in other words, the appropriate level determined in step C6 has been changed.

When the appropriate level determined in step C6 matches the value of the appropriate level 6417 of the activity in the filter information 64 (see "NO" route in step C9), and the processing is completed. For instance, when the activity conducted by the robot 10 in step C7 is an activity such as "sweetly smile", it may be determined that the activity conducted by the robot 10 in step C5 is appropriate. In such a case, it is determined that the appropriate level 6417 of the filter information 64 does not have to be updated.

On the other hand, when the appropriate level determined in step C6 does not match the value of the appropriate level 6417 of the activity in the filter information 64 (see "YES" route in step C9), and it is determined that the filter information has to be changed (modified). For instance, when the activity conducted by the robot 10 in step C7 is an activity such as "apologize", the activity conducted by the robot 10 in step C5 is inappropriate. In such a case, it is determined that (the appropriate level 6417 of) the filter information 64 has to be updated by the appropriate operation determination unit 51. In such a case, in the subsequent step C10, the appropriate level determination unit 54 updates the value of the appropriate level 6417 of the activity in the filter information 64 using the appropriate level determined in step C6. Subsequently, processing is completed.

As a result of checking in step C8, when the activity conducted by the robot 10 in step C5 is not registered in the filter information 64, that is, for the case of a new activity (see YES route in step C8), the flow proceeds to step C10. In the subsequent step C10, the appropriate level determination unit 54 registers a new activity conducted by the robot 10 into the filter information 64, thereby updating the filter information 64. Subsequently, the processing is completed. For instance, when it is determined in step C9 that the activity conducted by the robot 10 in step C7 is inappropriate, and it is determined that the appropriate level 6417 in the filter information 64 has to be updated by the appropriate operation determination unit 51, the appropriate level 6417 in the filter information 64 is reduced. Even when the reduced appropriate level 6417 is greater than a predetermined threshold, the appropriate level 6417 is set to a value smaller than a predetermined threshold (for instance, "2").

Consequently, when a similar subject is attempted to be presented in a similar environment later, the activity may be deterred.

Also, when an appropriate level 6417 is less than a predetermined threshold (see FALSE route in step C4), the processing is completed. As in the example described above, when "chief A", "boss C", "myself", and "friend A," are acquired as the person member, and "conference room A" is acquired as the position information, if the robot 10 attempts to present a subject of "snowboard", the activity is deterred. Therefore, when the location is the conference room A of a company and there are "chief A", "boss C", "myself", and "friend A", the subject of "snowboard" is not presented by the robot 10.

[6. Modification of Embodiment]

Figure 9:
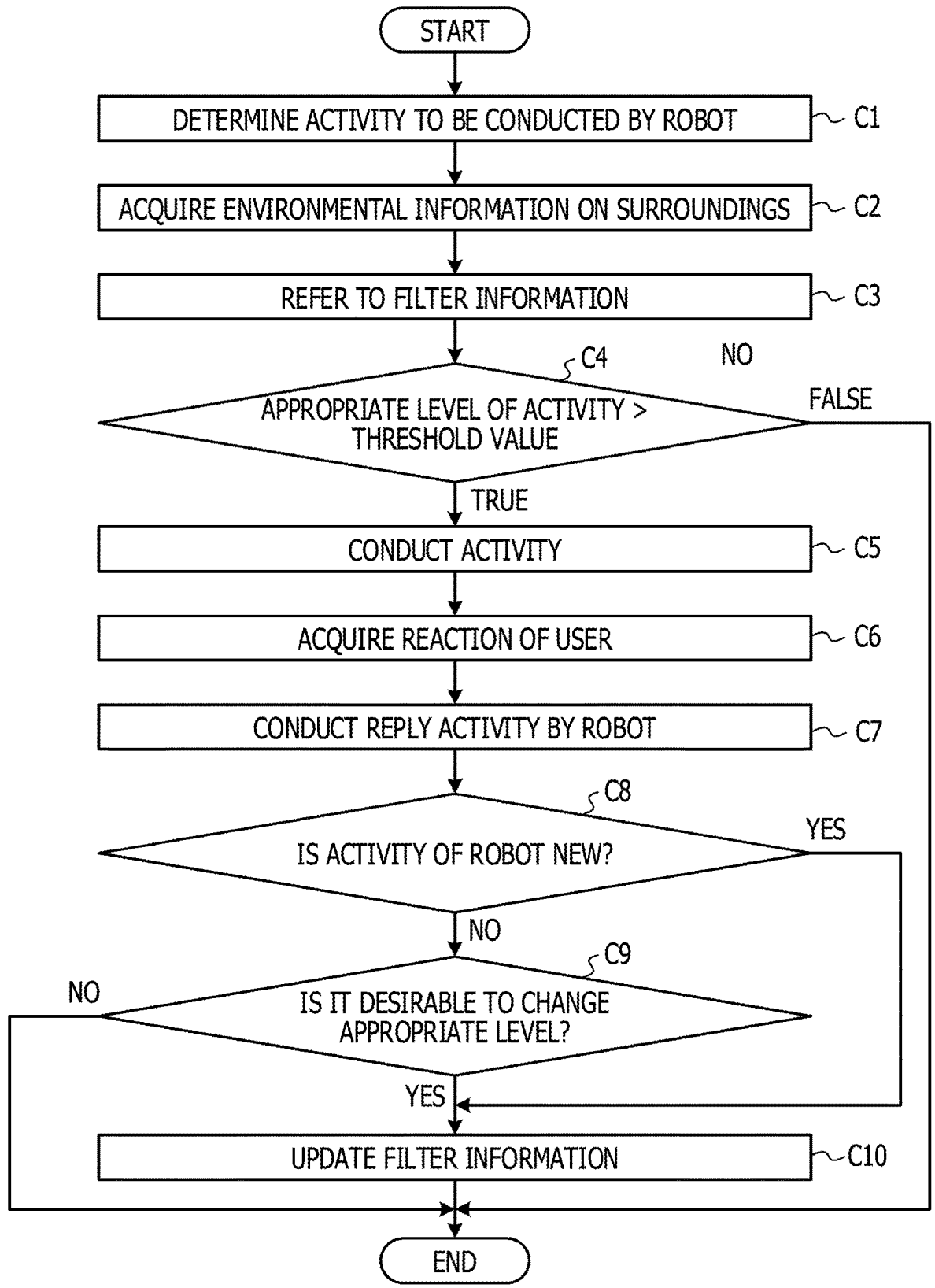
FIG. 9 is a flowchart for explaining a control method for a robot in the robot system as an example of the embodiment.

In the flowchart illustrated in FIG. 9, although an activity to be conducted is determined by the robot 10 itself in step C1, the embodiment is not limited to this. For instance, when an activity to be conducted by the robot 10 is determined, multiple activity candidates may be extracted, and a more preferable activity may be determined by referring to the filter information 64.

Figure 10:
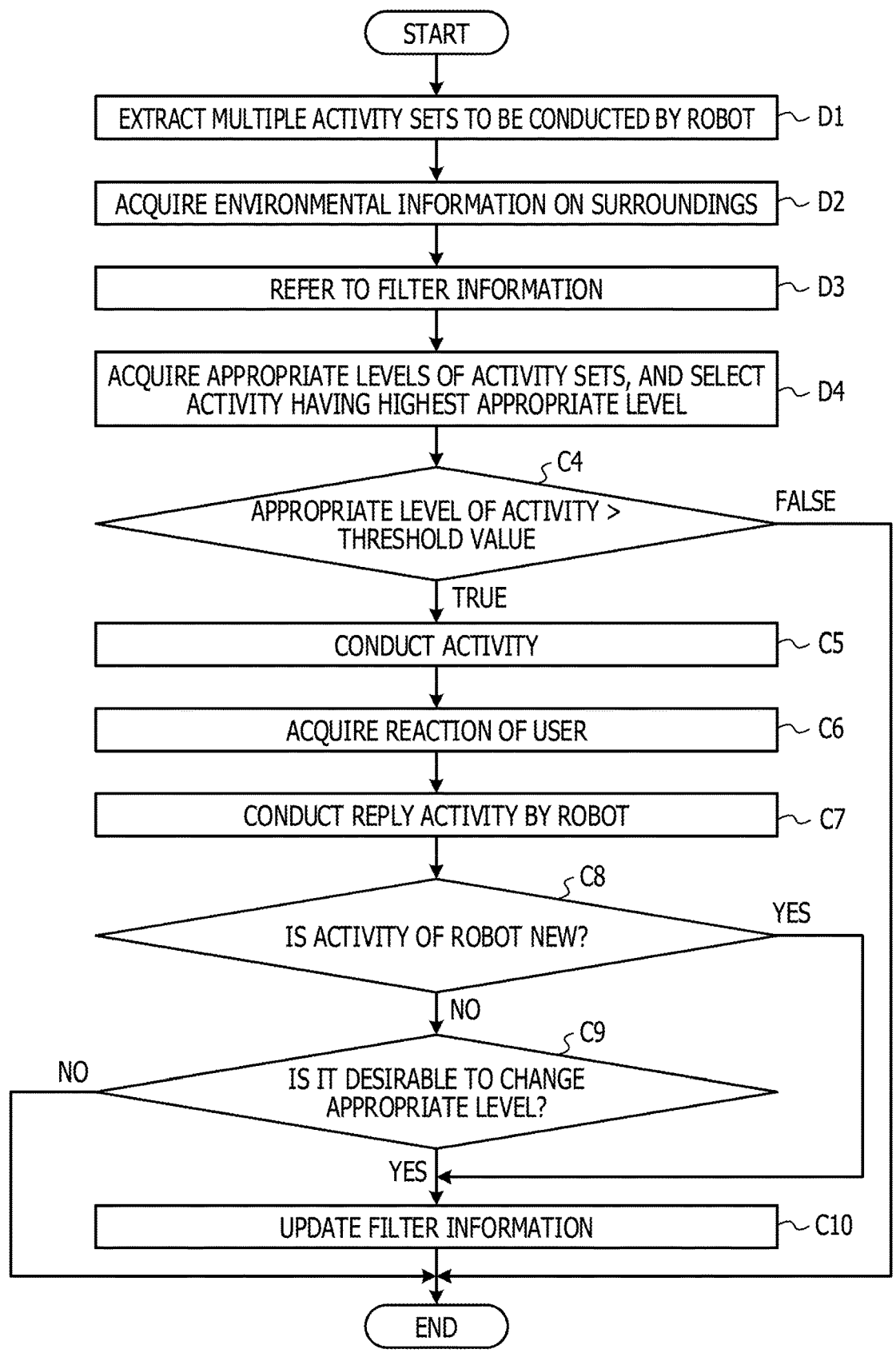
FIG. 10 is a flowchart for explaining a control method for a robot in a robot system as a modification of the embodiment.

A control method for the robot 10 in the robot system 1 as a modification of the embodiment will be described in accordance with the flowchart (steps D1 to D4, C4 to C10) illustrated in FIG. 10.

It is to be noted that in the drawings, steps (C4 to C10) labeled with the same symbol as the symbol already used indicate the same processing, thus a description thereof is omitted.

In step D1, the robot 10 extracts multiple activity sets as activity candidates to be conducted by itself. For instance, the subject determination unit 50 determines multiple subjects as the subject to be presented to a user.

In step D2, the environment recognition unit 52 of the robot 10 acquires the environmental information using the camera 21, the sensor 22, the microphone 23, and the GPS 27. For instance, the environment recognition unit 52 acquires the person member and position information.

In step D3, for each activity set extracted in step D1, the appropriate operation determination unit 51 refers to the filter information 64 based on the environmental information acquired in step D2, and acquires an appropriate level of each activity set.

In step D4, the appropriate level determination unit 54 compares between respective appropriate levels of the multiple activity sets, and gives a higher priority to an activity having a highest value of appropriate level, and processes the activity. In short, the appropriate level determination unit 54 selects an activity having a highest value of appropriate level.

In and after step C4, the activity having a highest value of appropriate level is processed.

[7. Effect]

In this manner, the control program in this embodiment records environmental information on communication between the robot 10 and a human as the log information 67, and uses filter information generated from the log information 67 for the control of the robot 10, thereby making it possible to present a subject appropriate to the surrounding environment of the robot. This is not achievable with related art.

The control program in this embodiment controls the robot 10 based on the past information on communication between the robot 10 and a human, and thus when the current environment is the same environment as in the past, may permit or deter the activity of the robot 10.

[8. Others]

In the embodiment described above, the activity evaluation dictionary 71 and the reply evaluation dictionary 70 stores not only the activities and replies when humans feel unpleasant, but also the activities and replies when humans don't feel unpleasant. However, only the activities and replies when humans feel unpleasant may be stored, or only the activities and replies when humans don't feel unpleasant may be stored. Alternatively, multiple activity evaluation dictionaries 71 and reply evaluation dictionaries 70 may be provided.

In the embodiment described above, in the processing (FIG. 8) of the appropriate level determination unit 54, an appropriate level is calculated based on the reply evaluation value (a) of a user, the activity evaluation value (b) for an activity of a user, the emotion values (c1, c2) of "delight" and "pleasure", and the emotion values (d1, d2) of "anger" and "sorrow". However, in the calculation of appropriate level, part of the above-mentioned numerical values may be used, or a numerical value indicating another emotion (for instance, "tension") may be used. Also, an operation for calculating an appropriate level is not limited to this.

Also, in the embodiment described above, the subject determination unit 50 in the robot 10 autonomously determines a subject to be presented to a user. However, the robot 10 may determine a subject to be presented to a user based on questions to the robot 10 from a user and the communication details between the robot 10 with a user.

Also, in the embodiment described above, as illustrated in FIG. 2, the server 30 is configured to have the functions as the log information generation unit 68, the event information generation unit 61, and the filter information generation unit 69. However, the robot 10 may be configured to have part or all of these functions. In that case, the server 30 may acquire information generated in the log information generation unit 68, the event information generation unit 61, and the filter information generation unit 69 in the robot 10 via the network 20, and may store the information in the HDD 34.

Also, in the embodiment described above, as illustrated in FIG. 2, the learning information 62, the user profile information 63, the log information 67, the event information 65, the filter information 64, the subject information 66, the reply evaluation dictionary 70, and the activity evaluation dictionary 71 are stored in the HDD 34 of the server 30. However, the robot 10 may be configured to have part or all of these pieces of information. In that case, the server 30 may acquire the above-mentioned information stored in the robot 10 via the network 20, and may store the information in the HDD 34.

Also, in the embodiment described above, as illustrated in FIG. 2, the robot 10 is configured to have the functions as the subject determination unit 50, the environment recognition unit 52, the voice recognition unit 56, the activity recognition unit 53, the facial expression recognition unit 55, the appropriate level determination unit 54, the appropriate operation determination unit 51, the reaction recognition unit 59, the emotion expression unit 57, and the utterance expression unit 58. However, the server 30 may be configured to have part or all of these functions. In that case, the robot 10 may acquire information generated in the subject determination unit 50, the environment recognition unit 52, the voice recognition unit 56, the activity recognition unit 53, the facial expression recognition unit 55, the appropriate level determination unit 54, the appropriate operation determination unit 51, the reaction recognition unit 59, the emotion expression unit 57, and the utterance expression unit 58 in the server 30 via network 20, and may store the information in the memory 15 or a HDD which is not illustrated.

Also, in the embodiment described above, as illustrated in FIG. 2, the log information 501 is stored in the memory 15 of the robot 10. However, part or all of the information of the log information 501 may be stored in the HDD 34 of the server 30. In that case, robot 10 may obtain log information 501 stored at the server 30 side via network 20, and may store in memory 15.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A robot control device comprising:
   a memory configured to store a control policy, the control policy including activity information, environmental information associated with the activity information, and level information associated with the activity information and the environmental information, the activity information indicating an activity to be conducted by a robot, the environmental information indicating an ambient situation determined based on a sensor signal output by a sensor of the robot at a time when the activity indicated by the associated activity information has been performed, the level information indicating an emotional degree determined based on a reaction of a person sensing by the robot in response that the activity indicated by the associated activity information has been performed in the ambient situation indicated by the associated environmental information; and
   a processor coupled to the memory, the processor configured to:
   determine a candidate for an activity to be conducted by the robot;
   acquire current environmental information indicating a current ambient situation determined based on the sensor signal output by the sensor upon a current time;
   retrieve, by using the current environmental information and the determined candidate for the activity, a first level information from among the level information included in the control policy stored in the memory, the retrieved first level information being one of the level information included in the control policy and being one associated with the activity information indicating the activity same as the determined candidate for the activity and further being one associated with the level information indicating the ambient situation categorized to a group same as the current ambient situation indicated by the current environmental information; and
   when the emotional degree indicated by the first level information does not satisfy a given condition, control the robot not to perform the determined candidate for the action in the current ambient situation.

2. The robot control device according to claim 1, wherein the current environmental information includes information indicating a current position of the robot.

3. The robot control device according to claim 1, wherein the current environmental information includes information regarding a person in the surrounding environment of a robot.

4. The robot control device according to claim 1, the processor is further configured to: determine the emotional in accordance with reaction information, the reaction information indicating the reaction to the activity, the reaction being acquired from a sensor mounted on the robot at the time of conduction of the activity.

5. The robot control device according to claim 4, wherein the reaction to the activity is an activity of a person who is present in a surrounding of the robot at the time of conduction of the past activity.

6. The robot control device according to claim 5, wherein when the activity of the person corresponds to negation, the appropriate level indicates inappropriate.

7. The robot control device according to claim 4, wherein the sensor includes at least one of a microphone and a camera.

8. A robot control method executed by a computer, the method comprising:
    determining a candidate for an activity to be conducted by a robot;
    acquiring current environmental information indicating a current ambient situation determined based on the sensor signal output by the sensor upon a current time;
    retrieving, by using the current environmental information and the determined candidate for the activity, a first level information from a memory of the computer, the memory being configured to store a control policy, the control policy including activity information, environmental information associated with the activity information, and level information associated with the activity information and the environmental information, the activity information indicating an activity to be conducted by a robot, the environmental information indicating an ambient situation determined based on a sensor signal output by a sensor of the robot at a time when the activity indicated by the associated activity information has been performed, the level information indicating an emotional degree determined based on a reaction of a person sensing by the robot in response that the activity indicated by the associated activity information has been performed in the ambient situation indicated by the associated environmental information, the retrieved first level information being one of the level information included in the control policy and being one associated with the activity information indicating the activity same as the determined candidate for the activity and further being one associated with the level information indicating the ambient situation categorized to a group same as the current ambient situation indicated by the current environmental information; and
    when the emotional degree indicated by the first level information does not satisfy a given condition, controlling the robot not to perform the determined candidate for the action in the current ambient situation.

9. The robot control method according to claim 8, wherein the current environmental information includes information indicating a current position of the robot.

10. The robot control method according to claim 8, wherein the current environmental information includes information regarding a person in the surrounding environment of a robot.

11. The robot control method according to claim 8, further comprising: determine the emotional degree in accordance with reaction information, the reaction information indicating the reaction to the activity, the reaction being acquired from a sensor mounted on the robot at the time of conduction of the activity.

12. The robot control method according to claim 11, wherein the reaction to the activity is an activity of a person who is present in a surrounding of the robot at the time of conduction of the past activity.

13. The robot control method according to claim 12, wherein when the activity of the person corresponds to negation, the appropriate level indicates inappropriate.

14. The robot control method according to claim 11, wherein the sensor includes at least one of a microphone and a camera.

15. A non-transitory computer-readable medium storing a robot control program that causes a computer to execute a process comprising:
    determining a candidate for an activity to be conducted by a robot;
    acquiring current environmental information indicating a current ambient situation determined based on the sensor signal output by the sensor upon a current time;
    retrieving, by using the current environmental information and the determined candidate for the activity, a first level information from a memory of the computer, the memory being configured to store a control policy, the control policy including activity information, environmental information associated with the activity information, and level information associated with the activity information and the environmental information, the activity information indicating an activity to be conducted by a robot, the environmental information indicating an ambient situation determined based on a sensor signal output by a sensor of the robot at a time when the activity indicated by the associated activity information has been performed, the level information indicating an emotional degree determined based on a reaction of a person sensing by the robot in response that the activity indicated by the associated activity information has been performed in the ambient situation indicated by the associated environmental information, the retrieved first level information being one of the level information included in the control policy and being one associated with the activity information indicating the activity same as the determined candidate for the activity and further being one associated with the level information indicating the ambient situation categorized to a group same as the current ambient situation indicated by the current environmental information; and
    when the emotional degree indicated by the first level information does not satisfy a given condition, controlling the robot not to perform the determined candidate for the action in the current ambient situation.

* * * * *